United States Patent
Hu et al.

(10) Patent No.: US 12,254,528 B2
(45) Date of Patent: Mar. 18, 2025

(54) CLOUD DESKTOP DISPLAY METHOD AND SYSTEM

(71) Applicant: ZTE CORPORATION, Shenzhen (CN)

(72) Inventors: Zhen Hu, Shenzhen (CN); Tianyun Guan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 220 days.

(21) Appl. No.: 18/247,136

(22) PCT Filed: Sep. 23, 2021

(86) PCT No.: PCT/CN2021/119951
§ 371 (c)(1),
(2) Date: Mar. 29, 2023

(87) PCT Pub. No.: WO2022/068671
PCT Pub. Date: Apr. 7, 2022

(65) Prior Publication Data
US 2023/0410245 A1 Dec. 21, 2023

(30) Foreign Application Priority Data
Sep. 30, 2020 (CN) .......................... 202011066250.7

(51) Int. Cl.
*G06T 1/20* (2006.01)
*G06F 9/455* (2018.01)

(52) U.S. Cl.
CPC ............ *G06T 1/20* (2013.01); *G06F 9/45558* (2013.01); *G06F 2009/45595* (2013.01)

(58) Field of Classification Search
CPC .................. G06T 1/20; G06F 9/45558; G06F 2009/45595; G06F 2009/45579; G06F 9/451; G06F 9/452; G06F 9/455
See application file for complete search history.

(56) References Cited

U.S. PATENT DOCUMENTS 9,485,290 B1   11/2016   Kolomeitsev et al.
10,147,115 B1  12/2018   Bidarkar et al.
(Continued)

FOREIGN PATENT DOCUMENTS

CN   101154166 A   4/2008
CN   103491188 A   1/2014
(Continued)

OTHER PUBLICATIONS

International Searching Authority. International Search Report and Written Opinion for PCT Application No. PCT/CN2021/119951 and English translation, mailed Dec. 17, 2021, pp. 1-11.
(Continued)

*Primary Examiner* — Edward Martello
(74) *Attorney, Agent, or Firm* — Vivacqua Crane, PLLC

(57) ABSTRACT

Disclosed are a cloud desktop display method and system. The method may include: creating a virtual graphics card for a virtual machine by utilizing a virtual machine platform, where the virtual graphics card is driven by a graphics driver on the virtual machine; and obtaining, by means of the graphics driver, a connection mode in which a client connects to a cloud desktop, and driving, according to the connection mode, the virtual graphics card to perform display processing on the cloud desktop according to the connection mode, to display the processed cloud desktop on the client. The connection mode is a mode in which the client directly connects to the cloud desktop, or a mode in which the client connects to the cloud desktop by means of a cloud desktop host.

10 Claims, 6 Drawing Sheets

(56) References Cited

U.S. PATENT DOCUMENTS

| | | | |
|---|---|---|---|
| 10,915,983 B2* | 2/2021 | Chen | G09G 5/006 |
| 2007/0198656 A1* | 8/2007 | Mazzaferri | G06F 9/5055 |
| | | | 709/218 |
| 2011/0145916 A1* | 6/2011 | McKenzie | G06F 21/79 |
| | | | 718/1 |
| 2013/0155083 A1* | 6/2013 | McKenzie | G06F 9/45558 |
| | | | 345/522 |
| 2018/0293090 A1* | 10/2018 | Oh | G06F 9/45558 |
| 2019/0310837 A1* | 10/2019 | Zmijewski | G06F 16/986 |
| 2020/0287735 A1 | 9/2020 | Liao | |

FOREIGN PATENT DOCUMENTS

| | | |
|---|---|---|
| CN | 107341020 A | 11/2017 |
| CN | 109712060 A | 5/2019 |
| CN | 109819201 A | 5/2019 |
| CN | 110647375 A | 1/2020 |
| CN | 111240631 A | 6/2020 |
| CN | 111310155 A | 6/2020 |
| CN | 111367753 A | 7/2020 |

OTHER PUBLICATIONS

European Patent Office. Extended European Search Report for EP Application No. 21874332.6, mailed Feb. 26, 2024, pp. 1-7.

Ma, W. "Application of Cloud Desktop Technology based on VDI in University Computer Laboratory," Journal of Lianyungang Normal College, Jan. 2020, pp. 82-86.

The State Intellectual Property Office of People's Republic of China. First Office Action for CN Application No. 202011066250.7 and English translation, mailed Jan. 16, 2025, pp. 1-11.

The State Intellectual Property Office of People's Republic of China. First Search Report for CN Application No. 202011066250.7 and English translation, mailed Jan. 16, 2025, pp. 1-11.

Zhu, K. "Research on Cloud Desktop Technology Architecture and Development," Scientific and Technological Innovation, Nov. 2017, pp. 121-122.

* cited by examiner

CLOUD DESKTOP DISPLAY METHOD AND SYSTEM

CROSS-REFERENCE TO RELATED APPLICATION

This application is a national stage filing under 35 U.S.C. § 371 of international application number PCT/CN2021/119951, filed Sep. 23, 2021, which claims priority to Chinese patent application No. 202011066250.7, filed Sep. 30, 2020. The contents of these applications are incorporated herein by reference in their entirety.

TECHNICAL FIELD

Embodiments of the present disclosure relate to the field of communications, and in particular, to a cloud desktop display method and system.

BACKGROUND

With the development of cloud computing, virtualization and other technologies, there are more and more cloud desktop users. The basic principle of cloud desktop is to virtualize the desktop of a computer through virtualization technology, such that a user can use any device to access his/her personal desktop system on the network at any place and at any time. Remote terminal devices and servers transmit desktop graphics through the Remote Desktop Protocol.

In a commonly used cloud desktop system (such as VMware, Citrix, etc.), there are generally two virtual graphics cards to meet the usage requirements of different scenarios. At present, the following cloud desktop connection modes and usage scenarios are commonly seen. Scenario 1: A user directly connects to the inside of a desktop to use a cloud desktop. Scenario 2: A user connects to and uses a cloud desktop by means of a host where virtualization is enabled. Scenario 3: The direct connection to the cloud desktop is abnormal, and the direct connection mode fails, so that connection by means of the host is required for fault locating and troubleshooting. One of the graphics cards is used when the user directly connects to the cloud desktop, to implement desktop rendering and provide a desktop image to the remote user. The other graphics card is used when the virtual desktop fails and management personnel process a fault or when the user connects to the cloud desktop by means of the host. Different graphics cards are activated according to usage scenarios. The use of two virtual graphics cards to deal with different scenarios has the disadvantages of slow or failed switching of graphics cards, occupation of a large quantity of system resources, increased system complexity, and a large amount of code that is difficult to maintain.

No effective solution has been proposed to solve the problems of slow or failed switching of graphics cards and occupation of a large quantity of system resources in the process of realizing the display of a cloud desktop through multiple virtual graphics cards in some cases.

SUMMARY

Embodiment of the present disclosure provide a cloud desktop display method and system, to solve, at least to some extent, the problems of slow or failed switching of graphics cards and occupation of a large quantity of system resources in the process of realizing the display of a cloud desktop through multiple virtual graphics cards in some cases.

According to an embodiment of the present disclosure, a cloud desktop display method is provided. The method includes: creating a virtual graphics card for a virtual machine by utilizing a virtual machine platform, where the virtual graphics card is driven by a graphics driver on the virtual machine; and obtaining, by means of the graphics driver, a connection mode in which a client connects to a cloud desktop, and driving, according to the connection mode, the virtual graphics card to perform display processing on the cloud desktop according to the connection mode, so as to display the processed cloud desktop on the client. The connection mode includes at least one of: a mode in which the client connects to the cloud desktop directly, or a mode in which the client connects to the cloud desktop by means of a cloud desktop host.

According to another embodiment of the present disclosure, a cloud desktop display system is further provided. The system includes: a virtual machine platform and a virtual machine. The virtual machine platform is configured for creating a virtual graphics card for the virtual machine, where the virtual graphics card is driven by a graphics driver on the virtual machine. The virtual machine is configured for obtaining, by means of the graphics driver, a connection mode in which a client connects to a cloud desktop, and driving, according to the connection mode, the virtual graphics card to perform display processing on the cloud desktop according to the connection mode, so as to display the processed cloud desktop on the client. The connection mode includes at least one of: a mode in which the client connects to the cloud desktop directly, or a mode in which the client connects to the cloud desktop by means of a cloud desktop host.

According to still another embodiment of the present disclosure, a non-transitory computer-readable storage medium is further provided, storing a computer program which, when executed by a processor, causes the processor to implement the above method embodiments.

According to still another embodiment of the present disclosure, an electronic device is further provided. The device includes: a processor and a memory storing a computer program which, when executed by the processor, causes the processor to implement the above method embodiments.

DETAILED DESCRIPTION

Embodiments of the present disclosure will be described in detail below in conjunction with the drawings.

A scheme provided in the embodiments of the present disclosure relates to a virtual graphics card technology in the field of virtualized cloud desktop. With the development of cloud computing, virtualization and other technologies, there are more and more cloud desktop users (where the cloud desktop mentioned in the present disclosure runs in the form of a virtual machine, and the cloud desktop can also be represented by the virtual machine). The following cloud desktop connection modes and usage scenarios are commonly seen. Scenario 1: A user uses a cloud desktop by connecting to an Internet Protocol (IP) address of the cloud desktop through a network. Scenario 2: A user uses a cloud desktop by connecting to an IP address of a back-end server (hereinafter referred to as a cloud desktop host) where the cloud desktop is located. Scenario 3: The direct connection to the cloud desktop through the network is abnormal, and the direct connection mode fails, so that connection by means of the cloud desktop host is required for fault locating and troubleshooting.

Figure 7:
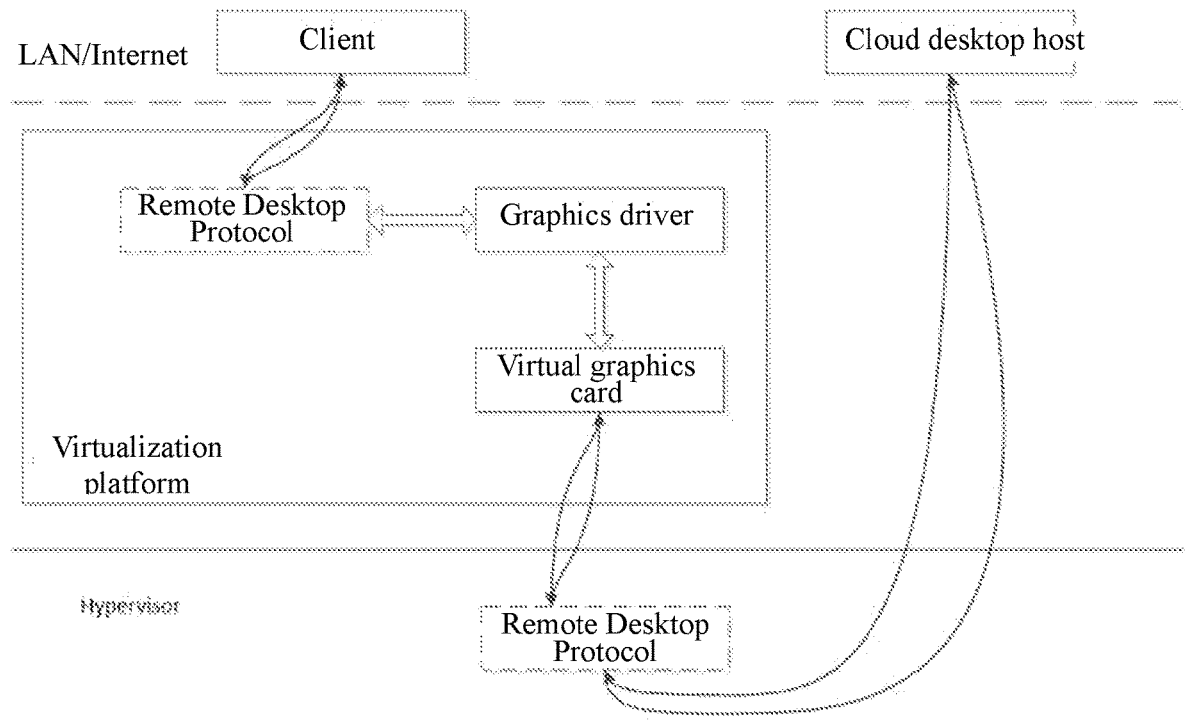
FIG. 7 is a schematic structural diagram of a cloud desktop display system according to an embodiment of the present disclosure.

Embodiments of the present disclosure can run on a network architecture shown in FIG. 7. As shown in FIG. 7, the network architecture includes two parts: a virtual machine and a virtual machine platform. The virtual machine is configured to create a virtual graphics card for a graphics card driver through a virtual drive, where the virtual graphics card is driven by the graphics driver on the virtual machine; and configured for obtaining, by means of the graphics driver, a connection mode in which a client connects to a cloud desktop, and driving, according to the connection mode, the virtual graphics card to perform display processing on the cloud desktop according to the connection mode, so as to display the processed cloud desktop on the client.

An embodiment of the present disclosure provides a method for displaying a cloud desktop running on the virtual machine, where one virtual graphics card is used to process the different usage scenarios described above, thereby avoiding the technical defects caused by repeated switching between a plurality of virtual graphics cards.

Figure 1:
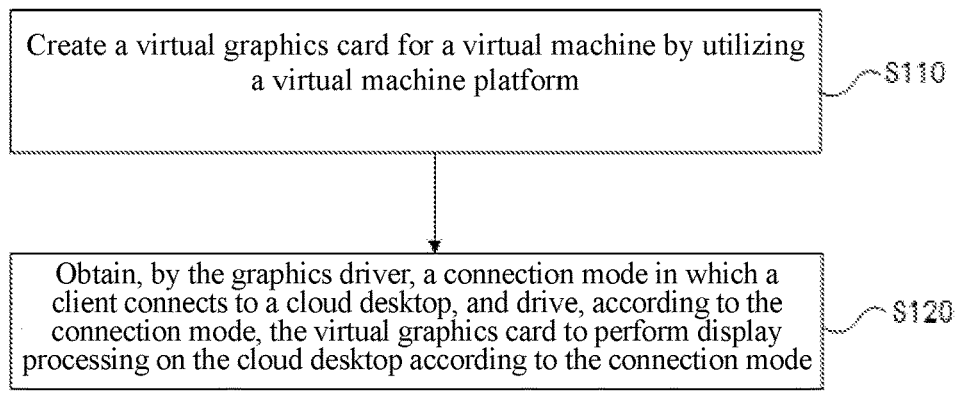
FIG. 1 is a flowchart of a cloud desktop display method according to an embodiment of the present disclosure.

For example, in this embodiment, a virtual graphics card is created for a virtual machine by utilizing a virtualization platform. While driving the virtual graphics card, a graphics card driver inside the virtual machine also provides desktop images for different usage scenarios. FIG. 1 is a flowchart of a cloud desktop display method, including the follows steps S110 to S120.

At S110, a virtual graphics card is created for a virtual machine by utilizing a virtual machine platform, where the virtual graphics card is driven by a graphics driver on the virtual machine.

In this step, the virtual machine platform may create a virtual graphics card for the virtual machine, where the virtual graphics card is driven by the graphics driver on the virtual machine; and provides hardware information related to the virtual graphics card to a cloud desktop operating system, so that the cloud desktop operating system accesses a display adapter that can identify the virtual graphics card as an entity. In this way, the virtual graphics card may use physical hardware such as a CPU of a computer or a server to perform a corresponding graphics processing operation, provide processed data to the cloud desktop operating system, and then store the processed data in a storage space such as a graphic memory of the virtual graphics card or a main memory of the virtual machine, for reading by the cloud desktop operating system or other accessing systems.

At S120, a connection mode in which a client connects to a cloud desktop is obtained by means of the graphics driver, and the virtual graphics card is driven according to the connection mode to perform display processing on the cloud desktop according to the connection mode, so as to display the processed cloud desktop on the client. The connection mode includes at least one of: a mode in which the client directly connects to the cloud desktop, or a mode in which the client connects to the cloud desktop by means of a cloud desktop host.

Through the above steps, because a virtual graphics card is created for the virtual machine by utilizing the virtual machine platform, the connection mode in which the client connects to the cloud desktop can be obtained through the graphics card driver that drives the virtual graphics card on the virtual machine, so as to distinguish between the connection mode in which the client directly connects to the cloud desktop and the connection mode in which the client connects to the cloud desktop by means of the cloud desktop host. Then, the virtual graphics card is driven according to the obtained connection mode to perform display processing on the cloud desktop according to the connection mode, so as to display the processed cloud desktop on the client. Therefore, this can solve, at least to some extent, the problems of slow or failed switching of graphics cards and occupation of a large quantity of system resources in the process of realizing the display of a cloud desktop through multiple virtual graphics cards in some cases, and avoid graphics card switching without increasing the quantity of system resources occupied and the system complexity, thereby improving the speed of display processing on the cloud desktop.

In step S120, the virtual machine platform receives a cloud desktop request from the cloud desktop operating system; forwards the cloud desktop request to the virtual graphics card; identifies, according to an input and output control interface of the virtual graphics card, whether the client directly connects to the cloud desktop operating system or the client connects to the cloud desktop by means of the cloud desktop host; and processes image information of the cloud desktop system based on the connection mode and returns the processed image information to the client. Because only one virtual graphics card is needed, graphics card switching is avoided. Only a process of outputting an image to the host is additionally performed when needed, in other words, the process of graphics card switching and resolution adjustment is avoided, thereby improving the processing speed of the cloud desktop operating system. This not only reduces the occupation of system resources by the kernel address space of the cloud desktop, interruptions and the like to reduce the load of the cloud desktop system, but also reduces the consumption of internal memory resources of the virtualization platform.

In an example, obtaining, by means of the graphics driver, a connection mode in which a client connects to a cloud desktop includes: determining that the client uses the connection mode of directly connecting to the cloud desktop when the graphics driver receives an instruction sent by an input and output control interface of the virtual graphics card; and determining that the client uses the connection mode of connecting to the cloud desktop by means of the cloud desktop host when the graphics driver receives a target mouse instruction sent by the cloud desktop host.

In this example, when the client directly connects to the cloud desktop, the virtual graphics card identifies, through the input and output control interface, that the connection mode of the client is directly connecting to the cloud desktop. After learning about the current connection mode, the virtual graphics card does not output a desktop image or other information to the host side, but instead, only provides an image to the client side and at the same time, informs a host-side program that the current connection mode is that the client directly connects to the cloud desktop. In this case, the host-side program does not operate. When using the connection mode of connecting to the cloud desktop by means of the cloud desktop host, the client may construct a target mouse instruction, and send the target mouse instruction to the graphics card driver in the cloud desktop operating system. When receiving the target mouse instruction sent by the cloud desktop host, the graphics driver determines that the client uses the connection mode of connecting to the cloud desktop by means of the cloud desktop host. In this case, the host-side program requests the cloud desktop for cloud desktop image information at regular intervals.

In an example embodiment, after creating a virtual graphics card for the virtual machine by utilizing the virtual machine platform, the method further includes: detecting whether a target object connects to the cloud desktop by means of the cloud desktop host when the client uses the connection mode of directly connecting to the cloud desktop and a fault occurs in the cloud desktop.

In an example embodiment, after creating a virtual graphics card for the virtual machine by utilizing the virtual machine platform, the method further includes: driving, when detecting that a target object connects to the cloud desktop by means of the cloud desktop host, the virtual graphics card by the graphics driver to perform the display processing on the cloud desktop to display the processed cloud desktop on the client, so that the target object processes the fault according to the processed cloud desktop.

In an example embodiment, driving, according to the connection mode, the virtual graphics card to perform display processing on the cloud desktop according to the connection mode includes: driving the virtual graphics card to render a cloud desktop image to be displayed when the client directly connects to the cloud desktop; and outputting the rendered image to an internal memory of the virtual machine, so that the virtual machine encodes the rendered image from the internal memory and sends the encoded image to the client.

In an example embodiment, driving, according to the connection mode, the virtual graphics card to perform display processing on the cloud desktop according to the connection mode includes: driving the virtual graphics card to render a cloud desktop image to be displayed when the client connects to the cloud desktop by means of the cloud desktop host; and outputting the rendered image to an internal memory of the virtual machine, so that the cloud desktop host encodes the rendered image from the internal memory and sends the encoded image to the client.

Figure 2:
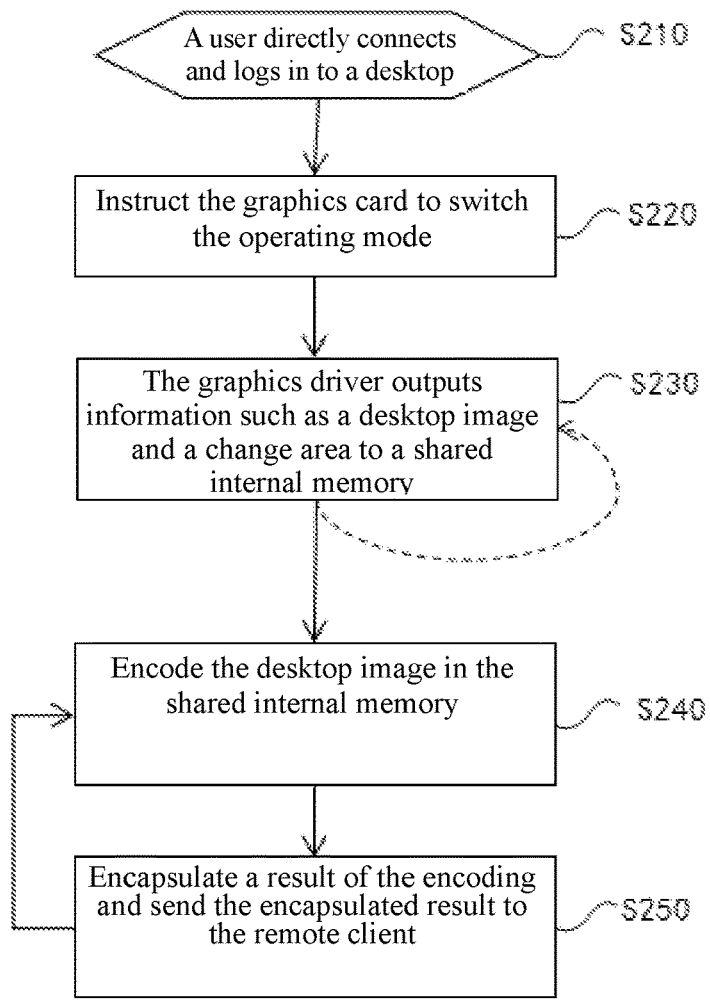
FIG. 2 is a flowchart of a display method when a client directly connects to a cloud desktop according to an embodiment of the present disclosure.

In an example, as shown in FIG. 2, when the client directly connects to the cloud desktop, the method includes the following steps S210 to S250.

At S210, it is determined that the client directly connects to the cloud desktop.

At S220, the virtual graphics card is instructed to switch to an operating mode in which the client directly connects to the cloud desktop.

At S230, the virtual graphics card is driven to render the cloud desktop image to be displayed; and then the rendered image is outputted to the internal memory of the virtual machine.

At S240, the virtual machine encodes the rendered image from the internal memory.

At S250, the encoded image is encapsulated and sent to the client.

In this example, when the client directly connects to the cloud desktop, the virtual graphics card obtains image information of the cloud desktop image each time after completing the rendering task, where the image information includes information such as the image and an image change area; and then outputs the information such as the image and the image change area to a shared internal memory of the virtual machine (equivalent to the internal memory of the virtual machine in the above embodiment). Then, the cloud desktop operating system reads the image information from the shared internal memory for encoding; and after completing the encoding, encapsulates a result of the encoding based on the Remote Desktop Protocol and sends the encapsulated result to the client (equivalent to the client in the above embodiment) for use by the user. The direct connection of the client to the cloud desktop can be completed by repeating steps S210 to S250.

Figure 3:
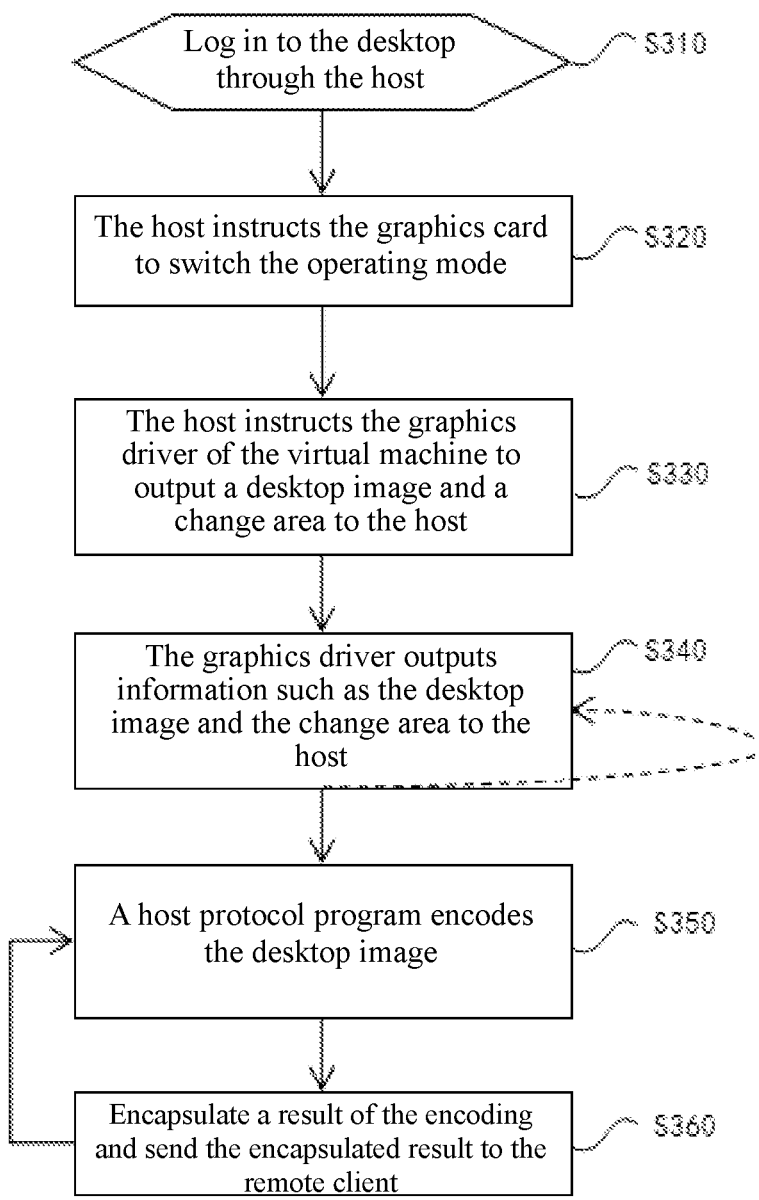
FIG. 3 is a flowchart of a display method when a client connects to a cloud desktop by means of a cloud desktop host according to an embodiment of the present disclosure.

In an example, as shown in FIG. 3, when the client connects to the cloud desktop by means of the cloud desktop host, the method includes the following steps S310 to S360.

At S310, the graphics card driver determines that the client uses the connection mode of connecting to the cloud desktop by means of the cloud desktop host.

At S320, the cloud desktop host instructs the virtual graphics card to switch to an operating mode in which the client connects to the cloud desktop by means of the cloud desktop host.

At S330, the cloud desktop host instructs the graphics card driver to output a cloud desktop image to the cloud desktop host.

At S340, the virtual machine drives the virtual graphics card to render the cloud desktop image to be displayed and then output the rendered image to the internal memory of the virtual machine; and the cloud desktop host reads the rendered image from the internal memory, that is, the graphics card driver outputs the rendered image to the cloud desktop host.

At S350, a host protocol program in the cloud desktop host encodes the rendered image.

At S360, the encoded image is encapsulated and sent to the client.

In this example, the virtual graphics card obtains image information of the cloud desktop image each time after completing the rendering task, where the image information includes information such as the image and an image change area; and then outputs the information such as the image and the image change area to a graphic memory. The host reads the image information, that is, the information such as the image and the image change area, from the graphic memory of the virtual graphics card at regular intervals, and encodes the image information. The interval is determined based on a preset refresh rate. After completing the encoding, the host encapsulates a result of the encoding and sends the encapsulated result to the client. The connection of the client to the cloud desktop by means of the cloud desktop host can be completed by repeating steps S310 to S330.

The cloud desktop display method provided in this embodiment further includes:

detecting whether a target object connects to the cloud desktop by means of the cloud desktop host when the client uses the connection mode of directly connecting to the cloud desktop and a fault occurs in the cloud desktop.

Figure 4:
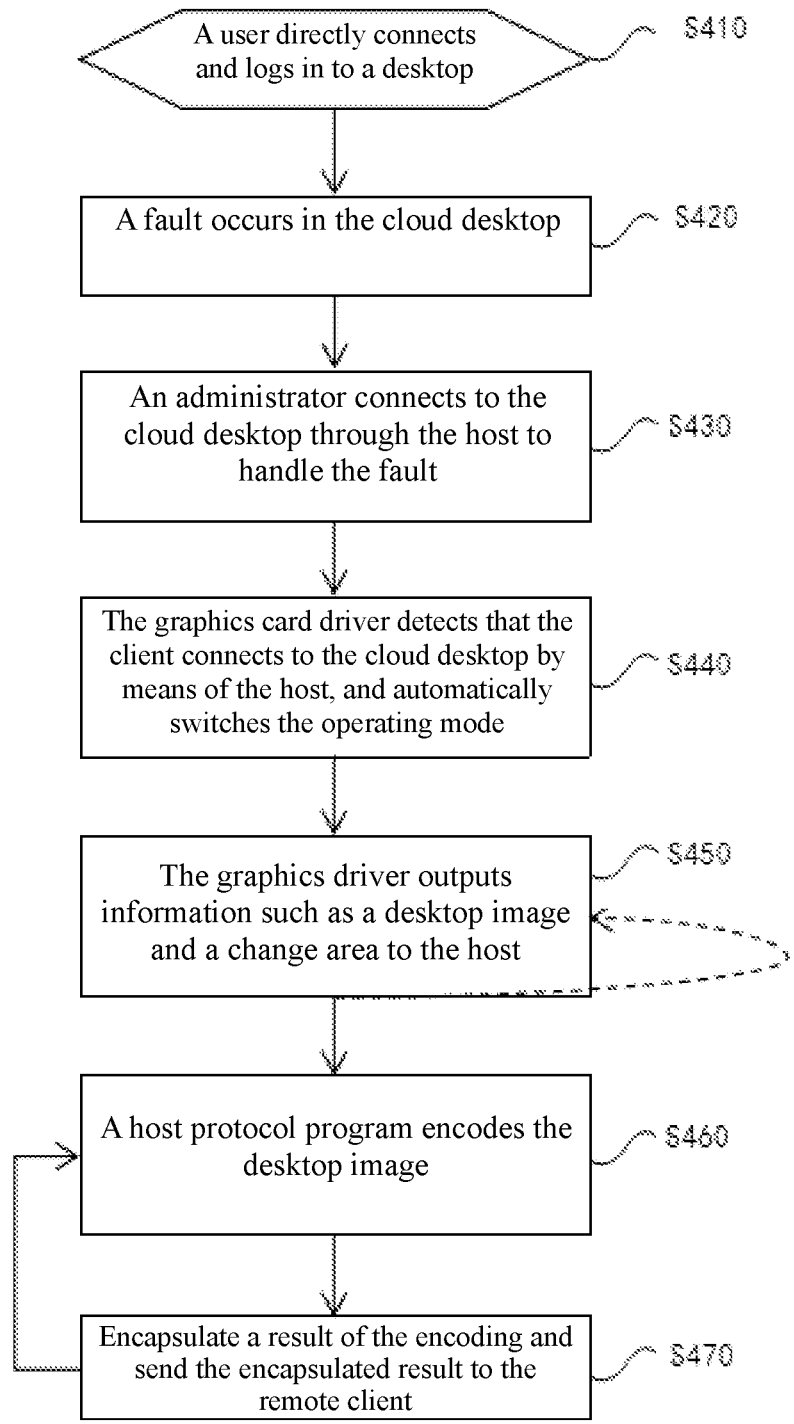
FIG. 4 is a flowchart of a method for processing a fault when a client directly connects to a cloud desktop according to an embodiment of the present disclosure.

In an example, as shown in FIG. 4, if a fault occurs when the client connects to the cloud desktop, the method may include the following processing steps S410 to S470.

At S410, it is determined that the client uses the connection mode of directly connecting to the cloud desktop.

At S420, when the cloud desktop cannot be used normally, the client reports the fault.

At S430, the client connects to the cloud desktop by means of the cloud desktop host.

At S440, the graphics card driver determines that the client uses the connection mode of connecting to the cloud desktop by means of the cloud desktop host, and the cloud desktop host instructs the virtual graphics card to switch to an operating mode in which the client connects to the cloud desktop by means of the cloud desktop host.

At S450, the cloud desktop host instructs the graphics card driver to output a cloud desktop image to the cloud desktop host. The virtual machine drives the virtual graphics card to render the cloud desktop image to be displayed and then output the rendered image to the internal memory of the virtual machine; and the cloud desktop host reads the rendered image from the internal memory, that is, the graphics card driver outputs the rendered image to the cloud desktop host.

At S460, a host protocol program in the cloud desktop host encodes the rendered image.

At S470, the encoded image is encapsulated and sent to the client.

In the above steps, if a fault such as black screen or non-responsive screen occurs when the client connects to the cloud desktop, and the user is unable to normally use the cloud desktop operating system, the user may connect to the cloud desktop operating system through the host to handle the fault, that is, send a target mouse instruction to the cloud desktop operating system through the cloud desktop host. The graphics card driver of the virtual graphics card determines according to the target mouse instruction that the current usage scenario requires switching of the operating mode, and the graphics card driver controls the virtual graphics card to complete the rendering task and copy the desktop image and the image change area to the graphic memory of the virtual graphics card. The cloud desktop host parses out the desktop image and the image change area from the graphic memory of the virtual graphics card, and then sends the desktop image and the image change area to the cloud desktop host, so that the cloud desktop host encodes the parsed-out image information. After completing the encoding, the cloud desktop host encapsulates a result of the encoding based on the Remote Desktop Protocol and sends the encapsulated result to an administrator, so that the fault can be located and handled. In this case, the switching process of the operating mode of the graphics card does not require the participation of a third party, which is automatically completed by the graphics card driver.

Figure 5:
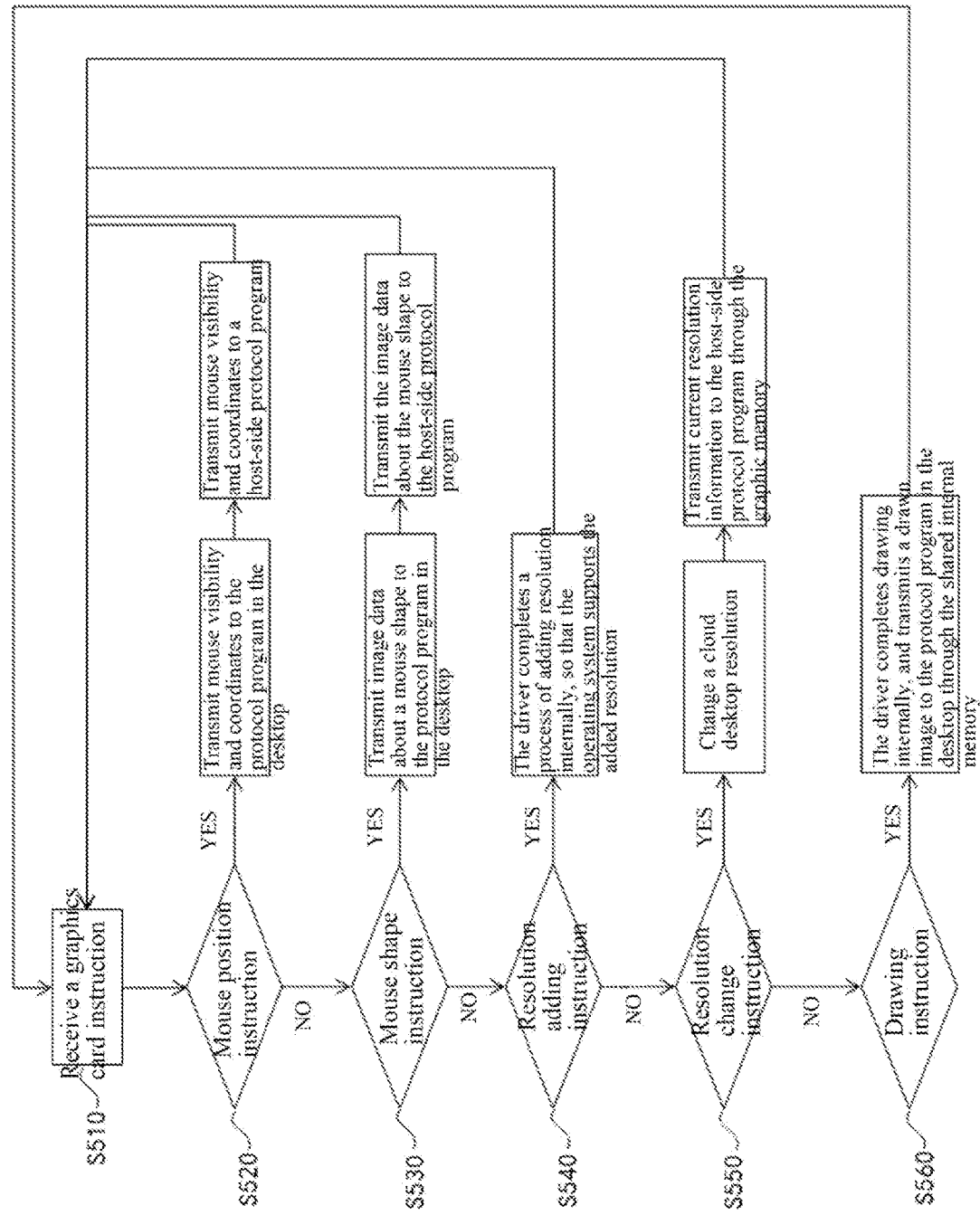
FIG. 5 is an operational flowchart of a virtual graphics card receiving an instruction sent by a virtual machine platform according to an embodiment of the present disclosure.

As shown in FIG. 5, the cloud desktop display method provided in this embodiment further includes: receiving, by the virtual graphics card, an instruction sent by the virtual machine platform and performing a corresponding action according to the received instruction. The following steps S510 to S570 may be included.

At S510, the virtual graphics card receives an instruction sent by the virtual machine platform.

At S520, it is determined whether the instruction received by the virtual graphics card is a mouse position instruction. If the instruction received is the mouse position instruction, information such as mouse visibility and coordinates is transmitted to a protocol program in the cloud desktop through the shared internal memory, and the mouse information is synchronously transmitted to a host-side protocol program; otherwise, S530 is performed.

At S530, it is determined whether the instruction received by the virtual graphics card is a mouse pointer shape instruction. If the instruction received is the mouse pointer shape instruction, image information about a mouse shape is transmitted to the protocol program in the cloud desktop through the shared internal memory, and the mouse shape information is synchronously transmitted to the host-side protocol program; otherwise, S540 is performed.

At S540, it is determined whether the instruction received by the virtual graphics card is a resolution adding instruction. If the instruction received is the resolution adding instruction (and the virtual graphics card supports adding any resolution), a specified resolution is added inside the graphics driver and reported to the operating system, so that the operating system supports the newly added resolution; otherwise, S550 is performed.

At S550, it is determined whether the instruction received by the virtual graphics card is a resolution change instruction. If the instruction received is the resolution change instruction, the graphics driver changes a cloud desktop resolution to a specified value, and transmits current resolution information to the host-side program through the graphic memory; otherwise, S560 is performed.

At S560, it is determined whether the instruction received by the virtual graphics card is a drawing instruction. If the instruction received is the drawing instruction, the drawing is completed inside the graphics driver, drawn image data is transmitted to the protocol program in the cloud desktop through the shared internal memory, and at the same time, the drawn image data is transmitted to the host-side protocol program through the graphic memory; otherwise, S570 is performed.

At S570, the process goes back to S510 (not shown).

It should be noted that the execution order of the above steps S520 to S560 may be arbitrarily changed according to actual operating scenarios, and if the client directly connects to the cloud desktop operating system, the host does not operate, and the cloud desktop operating system does not send any data to the host.

Figure 6:
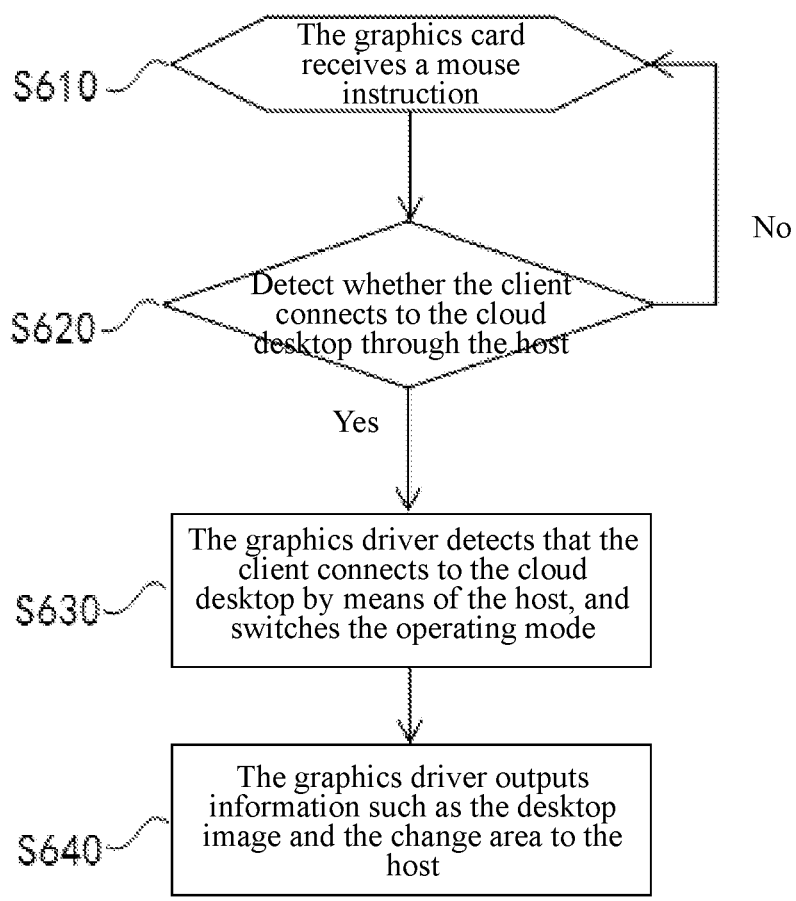
FIG. 6 is an operational flowchart of a virtual graphics card in the event of a fault that occurs when a client directly connects to a cloud desktop according to an embodiment of the present disclosure.

For example, as shown in FIG. 6, if a fault occurs when the client directly connects to the cloud desktop operating system, an operational process of the virtual graphics card may include the following steps S610 to S640.

At S610, the virtual graphics card receives a mouse instruction.

At S620, it is detected according to the mouse instruction whether the client connects to the cloud desktop operating system by means of the cloud desktop host.

At S630, if the client connects to the cloud desktop operating system by means of the cloud desktop host, the virtual graphics card automatically switches its operating mode.

At S640, image information is outputted to the graphic memory for the cloud desktop host to read.

Through the above steps, because the virtual graphics card is created for the virtual machine by utilizing the virtual machine platform, the connection mode in which the client connects to the cloud desktop can be obtained through the graphics card driver that drives the virtual graphics card on the virtual machine, so as to distinguish between the connection mode in which the client directly connects to the cloud desktop and the connection mode in which the client connects to the cloud desktop by means of the cloud desktop host. Then, the virtual graphics card is driven according to the obtained connection mode to perform display processing on the cloud desktop according to the connection mode, so as to display the processed cloud desktop on the client. Therefore, the present disclosure can solve, at least to some extent, the problems of slow or failed switching between two graphics cards in the conventional cloud desktop system, occupation of a large quantity of system resources, and a large amount of code that is difficult to maintain, and has the following beneficial effects.

1. Because only one virtual graphics card is needed, graphics card switching is avoided. Only a process of outputting an image to the cloud desktop host is additionally performed when needed, in other words, the process of graphics card switching and resolution adjustment is avoided. Therefore, the speed of displaying the cloud desktop is increased, and a more user-friendly process is achieved.
2. The occupation of system resources by the kernel address space of the virtual machine, interruptions and the like is reduced, thereby reducing the load of the virtual machine.
3. Because there is only one virtual graphics card, the consumption of internal memory resource of the virtual machine platform is reduced.
4. The cloud desktop display system is made simpler, easier to maintain, and more user-friendly.
5. The present disclosure facilitates troubleshooting. Sometimes a fault may occur when the client directly connects to the cloud desktop, for example, the desktop image cannot be seen. In this case, the administrator needs to locate and handle the fault. In a conventional multi-graphics card scenario, only after graphics card switching is implemented in the cloud desktop, the administrator can see the cloud desktop image via the connection through the cloud desktop host. If the graphics card switching fails or the switching module is abnormal, the administrator cannot access the cloud desktop. In the present disclosure, only one virtual graphics card is needed, and after performing display processing on the cloud desktop, the virtual graphics card can automatically switch the operating mode to output a cloud desktop image to the cloud desktop host when a fault occurs. In this way, the administrator can conveniently handle the fault.
6. The single virtual graphics card can also support multi-screen displaying.

From the above detailed description of the embodiments, those having ordinary skills in the art can clearly understand that the methods in the above embodiments can be implemented by software and a necessary general-purpose hardware platform, and of course can also be implemented by hardware, but in many cases, the former is a better implementation. Based on such an understanding, the technical schemes of the present disclosure essentially or the part making contributions in some cases may be embodied in the form of a software product. The computer software product is stored in a storage medium (such as a ROM/RAM, a magnetic disk, an optical disc, etc.), and includes several instructions for instructing a terminal device (which may be a mobile phone, a computer, a server, a network device, or the like) to implement the methods described in the embodiments of the present disclosure.

An embodiment of the present disclosure further provides a cloud desktop display system. The system is used for implementing the above-mentioned embodiments and example implementations. Details that have already been described will not be repeated here. As used herein, the term "module" may be a combination of software and/or hardware that implements a predetermined function. Although the apparatus described in the following embodiments is preferably implemented in the form of software, an implementation using hardware or using a combination of software and hardware is also possible and can be conceived of.

As shown in FIG. 7, the cloud desktop display system includes a virtual machine platform and a virtual machine. The virtual machine platform is configured for creating a virtual graphics card for the virtual machine, where the virtual graphics card is driven by a graphics driver on the virtual machine. The virtual machine is configured for obtaining, by means of the graphics driver, a connection mode in which a client connects to a cloud desktop, and driving, according to the connection mode, the virtual graphics card to perform display processing on the cloud desktop according to the connection mode, so as to display the processed cloud desktop on the client. The connection mode includes at least one of: a mode in which the client directly connects to the cloud desktop, or a mode in which the client connects to the cloud desktop by means of a cloud desktop host.

It should be noted that, the virtual machine platform may create a virtual graphics card for the virtual machine, where the virtual graphics card is driven by the graphics driver on the virtual machine; and provides hardware information related to the virtual graphics card to a cloud desktop operating system, so that the cloud desktop operating system accesses a display adapter that can identify the virtual graphics card as an entity. In this way, the virtual graphics card may use physical hardware such as a CPU of a computer or a server to perform a corresponding graphics processing operation, provide processed data to the cloud desktop operating system, and then store the processed data in a storage space such as a graphic memory of the virtual graphics card or a main memory of the virtual machine, for reading by the cloud desktop operating system or other accessing systems.

In an example, the virtual machine is further configured for determining that the client uses the connection mode of directly connecting to the cloud desktop when the graphics driver receives an instruction sent by an input and output control interface of the virtual graphics card; and determining that the client uses the connection mode of connecting to the cloud desktop by means of the cloud desktop host when the graphics driver receives a target mouse instruction sent by the cloud desktop host.

In this example, the virtual machine receives, through the graphics driver, the instruction sent by the input and output control interface of the virtual graphics card or the target mouse instruction sent by the cloud desktop host; then determines the connection mode in which the client connects to the cloud desktop based on the instruction sent by the input and output control interface of the virtual graphics card or the target mouse instruction; and switches, based on the obtained connection mode, to an operating mode corresponding to one of two operating scenarios: the client directly connects to the cloud desktop or the client connects to the cloud desktop by means of the cloud desktop host.

It should be noted that it is determined that the client uses the connection mode of directly connecting to the cloud desktop when the graphics driver receives an instruction sent by an input and output control interface of the virtual graphics card. The virtual graphics card obtains image information of the cloud desktop image each time after completing the rendering task, where the image information includes information such as the image and an image change area; and then outputs the information such as the image and the image change area to a shared internal memory of the virtual machine (equivalent to the internal memory of the virtual machine in the above embodiment). Then, the cloud desktop operating system reads the image information from the shared internal memory for encoding; and after completing the encoding, encapsulates a result of the encoding based on the Remote Desktop Protocol and sends the encapsulated result to the client (equivalent to the client in the above embodiment) for use by the user. It is determined that the client uses the connection mode of connecting to the cloud desktop by means of the cloud desktop host when the graphics driver receives a target mouse instruction sent by the cloud desktop host. The virtual graphics card obtains image information of the cloud desktop image each time after completing the rendering task, where the image information includes information such as the image and an image change area; and then outputs the information such as the image and the image change area to the graphic memory. The host reads the image information, that is, the information such as the image and the image change area, from the graphic memory of the virtual graphics card at regular intervals, and encodes the image information. The interval is determined based on a preset refresh rate. After completing the encoding, the host encapsulates a result of the encoding and sends the encapsulated result to the client.

In an example, the virtual machine is further configured for detecting whether a target object connects to the cloud desktop by means of the cloud desktop host when the client uses the connection mode of directly connecting to the cloud desktop and a fault occurs in the cloud desktop.

The virtual machine drives, when detecting that a target object connects to the cloud desktop by means of the cloud desktop host, the virtual graphics card by means of the graphics driver to perform the display processing on the cloud desktop to display the processed cloud desktop on the client, so that the target object processes the fault according to the processed cloud desktop.

In this embodiment, when the client directly connects to the cloud desktop, if the cloud desktop is faulty and the client cannot normally connect to the cloud desktop, the virtual machine detects whether a target object connects to the cloud desktop by means of the cloud desktop host. The target object may be a user or management and maintenance personnel of the cloud desktop. If the virtual machine detects that a target object connects to the cloud desktop by means of the cloud desktop host, that is, the graphics driver receives the target mouse command, the graphics driver drives the virtual graphics card to render a cloud desktop image to be displayed, and outputs the rendered image to an internal memory of the virtual machine, so that the cloud desktop host encodes the rendered image from the internal memory and sends the encoded image to the client.

Figure 8:
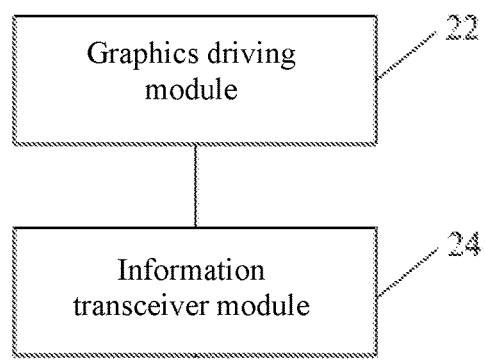
FIG. 8 is a schematic block diagram of a cloud desktop display system according to an embodiment of the present disclosure.

As shown in FIG. 8, the cloud desktop display system includes a graphics card driving module 22 and an information transceiver module 24.

The graphics card driving module 22 is configured for identifying the connection mode in which the client connects to the cloud desktop, and driving the virtual graphics card to implement a rendering task of an operating system in the cloud desktop and then output image information to a virtual internal memory of the virtual machine.

In an embodiment, the graphics card driving module 22 determines, based on a received target mouse instruction, that the client connects to the cloud desktop by means of the cloud desktop host; or, the graphics card driving module 22 determines, by reading input information sent to the virtual graphics card by the cloud desktop operating system, that the client directly connects to the virtual machine. After obtaining the connection mode of the user, the graphics card driving module 22 switches the virtual graphics card to a corresponding operating mode to provide a cloud desktop image to a remote client.

The information transceiver module 24 is configured for receiving input information from the client and sending a cloud desktop image to the client; or, sending image information to the host.

In an embodiment, the information transceiver module 24 is further configured for receiving data request information from the cloud desktop host. The data request information includes information, such as a cloud desktop image and a change area of the image, that the cloud desktop host requests the graphic memory of the virtual graphics card for. The information transceiver module 24 is responsible for forwarding network messages, including sending an encoding result of the virtual machine to the client, sending a request of the client to the cloud desktop operating system, sending a data request of the host to the graphics card driver of the virtual graphics card, and sending image information in the graphic memory of the virtual graphics card to the cloud desktop host.

In an example, the cloud desktop display system further includes a cloud desktop encoding module and an input module.

The cloud desktop encoding module is configured for reading and encoding image information in the shared internal memory at regular intervals when the client directly connects to the cloud desktop, and sending the encoded image information to the information transceiver module 24 after completing the encoding.

The input module is configured for inputting a user keyboard/mouse message.

In an example, when determining, based on the received target mouse instruction, that the client connects to the cloud desktop by means of the cloud desktop host, the graphics card driving module 22 drives the virtual graphics card to render a cloud desktop image to be displayed, and outputs the rendered image to an internal memory of the virtual machine, so that the cloud desktop host encodes the rendered image from the internal memory and sends the encoded image to the client. The cloud desktop host includes: a graphics card interaction control module, a host encoding module, and a network module. The graphics card interaction control module is configured for notifying the graphics card driving module 22 whether to output information such as a desktop image and a change area to the graphic memory of the virtual graphics card; and further configured for parsing out the information such as the desktop image and the change area from the graphic memory of the virtual graphics card and sending the information to the host encoding module. The host encoding module is configured to compression-code the information such as the desktop image and the change area, and sends a coding result to the network module. The network module is configured to forward network messages, including sending the coding result to the client and forwarding the input of the client. In an embodiment, the cloud desktop host further includes a host input module configured to input a user keyboard/mouse message.

It should be noted that the above modules may be implemented by software or hardware. The hardware implementation may be realized in the following manner, but the present disclosure is not limited thereto: the above modules are all located in the same processor; or, the above modules are located in different processors in any combination.

An embodiment of the present disclosure further provides a non-transitory computer-readable storage medium, storing a computer program which, when executed by a processor, causes the processor to implement any one of the above method embodiments.

In an example embodiment, the computer-readable storage medium may include, but not limited to, any medium that can store the computer program, such as a USB flash drive, a Read-Only Memory (ROM), a Random Access Memory (RAM), a removable hard disk, a magnetic disk, or an optical disk.

For example, in this embodiment, the storage medium may be configured to store program code to execute the following operations:

S1: creating a virtual graphics card for a virtual machine by utilizing a virtual machine platform, where the virtual graphics card is driven by a graphics driver on the virtual machine; and S2: obtaining, by means of the graphics driver, a connection mode in which a client connects to a cloud desktop, and driving, according to the connection mode, the virtual graphics card to perform display processing on the cloud desktop according to the connection mode, so as to display the processed cloud desktop on the client. The connection mode includes at least one of: a mode in which the client directly connects to the cloud desktop, or a mode in which the client connects to the cloud desktop by means of a cloud desktop host.

An embodiment of the present disclosure further provides an electronic device. The device includes: a processor, and a memory storing a computer program which, when executed by the processor, causes the processor to implement any one of the above method embodiments.

For example, in this embodiment, the processor may be configured to execute the computer program to implement the following operations:

S1: creating a virtual graphics card for a virtual machine by utilizing a virtual machine platform, where the virtual graphics card is driven by a graphics driver on the virtual machine; and S2: obtaining, by means of the graphics driver, a connection mode in which a client connects to a cloud desktop, and driving, according to the connection mode, the virtual graphics card to perform display processing on the cloud desktop according to the connection mode, so as to display the processed cloud desktop on the client. The connection mode includes at least one of: a mode in which the client directly connects to the cloud desktop, or a mode in which the client connects to the cloud desktop by means of a cloud desktop host.

In an example embodiment, the electronic device may further include a transmission device and an input/output device. The transmission device is connected to the processor. The input/output device is connected to the processor.

For specific examples in this embodiment, reference may be made to the examples described in the above embodiments and example implementations, and the details will not be repeated in this embodiment.

By the present disclosure, because the virtual graphics card is created for the virtual machine by utilizing the virtual machine platform, the connection mode in which the client connects to the cloud desktop can be obtained through the graphics card driver that drives the virtual graphics card on the virtual machine, so as to distinguish between the connection mode in which the client directly connects to the cloud desktop and the connection mode in which the client connects to the cloud desktop by means of the cloud desktop host. Then, the virtual graphics card is driven according to the obtained connection mode to perform display processing on the cloud desktop according to the connection mode, so as to display the processed cloud desktop on the client. Therefore, this can solve, at least to some extent, the problems of slow or failed switching of graphics cards and occupation of a large quantity of system resources in the process of realizing the display of a cloud desktop through multiple virtual graphics cards in some cases, and avoid graphics card switching without increasing the quantity of system resources occupied and the system complexity, thereby improving the speed of display processing on the cloud desktop.

It will be apparent to those having ordinary skills in the art that, the modules or steps of the present disclosure may be realized by a general-purpose computing device; may be centrally deployed on a single computing device or distributed on a network composed of a plurality of computing devices; and may be implemented with program code executable by a computing device, and therefore may be stored in a storage device for execution by a computing device. In some cases, the steps shown or described may be performed in an order different from the orders as described herein. Alternatively, the modules or steps may be respectively fabricated into integrated circuit modules, or a plurality of modules or steps may be fabricated into a single integrated circuit module. Therefore, the present disclosure is not limited to any particular combination of hardware and software.

The above description is only example embodiments of the present disclosure, and is not intended to limit the present disclosure. To those having ordinary skills in the art, various modifications and variations may be made to the present disclosure. Any modifications, equivalent replacements, and improvements made within the principle of the present disclosure shall fall within the scope of the present disclosure.

What is claimed is:

1. A cloud desktop display method, comprising:
    creating a virtual graphics card for a virtual machine by utilizing a virtual machine platform, wherein the virtual graphics card is driven by a graphics driver on the virtual machine; and
    obtaining, by means of the graphics driver, a connection mode in which a client connects to a cloud desktop, and driving, according to the connection mode, the virtual graphics card to perform display processing on the cloud desktop according to the connection mode, to display the processed cloud desktop on the client, wherein the connection mode comprises at least one of:

a mode in which the client connects to the cloud desktop directly, or a mode in which the client connects to the cloud desktop by means of a cloud desktop host.

2. The method of claim 1, wherein obtaining, by means of the graphics driver, a connection mode in which a client connects to a cloud desktop comprises:

determining that the client uses the connection mode of directly connecting to the cloud desktop, in response to the graphics driver receiving an instruction sent by an input and output control interface of the virtual graphics card; and determining that the client uses the connection mode of connecting to the cloud desktop by means of the cloud desktop host, in response to the graphics driver receiving a target mouse instruction sent by the cloud desktop host.

3. The method of claim 1, wherein after creating a virtual graphics card for a virtual machine by utilizing a virtual machine platform, the method further comprises:

detecting whether a target object connects to the cloud desktop by means of the cloud desktop host, in response to the client using the connection mode of directly connecting to the cloud desktop and a fault occurring in the cloud desktop.

4. The method of claim 3, wherein after creating a virtual graphics card for a virtual machine by utilizing a virtual machine platform, the method further comprises:

driving, in response to a detection that a target object connects to the cloud desktop by means of the cloud desktop host, the virtual graphics card by means of the graphics driver to perform the display processing on the cloud desktop to display the processed cloud desktop on the client, so that the target object processes the fault according to the processed cloud desktop.

5. The method of claim 1, wherein driving, according to the connection mode, the virtual graphics card to perform display processing on the cloud desktop according to the connection mode comprises:

driving the virtual graphics card to render a cloud desktop image to be displayed, in response to the client using the connection mode of directly connecting to the cloud desktop; and outputting the rendered image to an internal memory of the virtual machine, so that the virtual machine encodes the rendered image from the internal memory and sends the encoded image to the client.

6. The method of claim 1, wherein driving, according to the connection mode, the virtual graphics card to perform display processing on the cloud desktop according to the connection mode comprises:

driving the virtual graphics card to render a cloud desktop image to be displayed, in response to the client connecting to the cloud desktop by means of the cloud desktop host; and outputting the image rendered to an internal memory of the virtual machine, so that the cloud desktop host encodes the rendered image from the internal memory and sends the encoded image to the client.

7. A non-transitory computer-readable storage medium, storing a computer program which, when executed by a processor, causes the processor to perform the method of claim 1.

8. A cloud desktop display system, comprising:

a virtual machine platform and a virtual machine, wherein:

the virtual machine platform is configured to create a virtual graphics card for the virtual machine, wherein the virtual graphics card is driven by a graphics driver on the virtual machine; and the virtual machine is configured to obtain, by means of the graphics driver, a connection mode in which a client connects to a cloud desktop, and driving, according to the connection mode, the virtual graphics card to perform display processing on the cloud desktop according to the connection mode, to display the processed cloud desktop on the client, wherein the connection mode comprises at least one of:

a mode in which the client connects to the cloud desktop directly, or a mode in which the client connects to the cloud desktop by means of a cloud desktop host.

9. The system of claim 8, wherein the virtual machine is further configured to determine that the client uses the connection mode of directly connecting to the cloud desktop, in response to the graphics driver receiving an instruction sent by an input and output control interface of the virtual graphics card; and determining that the client uses the connection mode of connecting to the cloud desktop by means of the cloud desktop host, in response to the graphics driver receiving a target mouse instruction sent by the cloud desktop host.

10. An electronic device, comprising a memory, a processor, and a computer program stored in the memory and executable by the processor which, when executed by the processor, causes the processor to perform a cloud desktop display method, the method comprising:

creating a virtual graphics card for a virtual machine by utilizing a virtual machine platform, wherein the virtual graphics card is driven by a graphics driver on the virtual machine; and obtaining, by means of the graphics driver, a connection mode in which a client connects to a cloud desktop, and driving, according to the connection mode, the virtual graphics card to perform display processing on the cloud desktop according to the connection mode, to display the processed cloud desktop on the client, wherein the connection mode comprises at least one of:

a mode in which the client connects to the cloud desktop directly, or a mode in which the client connects to the cloud desktop by means of a cloud desktop host.

* * * * *